(12) United States Patent
Saito et al.

(10) Patent No.: US 11,657,970 B2
(45) Date of Patent: May 23, 2023

(54) DIELECTRIC SUBSTANCE, ELECTRONIC DEVICE AND MULTILAYER CERAMIC CAPACITOR

(71) Applicant: TAIYO YUDEN CO., LTD., Tokyo (JP)

(72) Inventors: Yuta Saito, Takasaki (JP); Tomoya Hagiwara, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 111 days.

(21) Appl. No.: 17/233,280

(22) Filed: Apr. 16, 2021

(65) Prior Publication Data
US 2021/0350982 A1   Nov. 11, 2021

(30) Foreign Application Priority Data

May 7, 2020   (JP) .............................. JP2020-082117

(51) Int. Cl.
| | |
|---|---|
| *H01G 4/30* | (2006.01) |
| *H01G 4/12* | (2006.01) |
| *H01G 4/008* | (2006.01) |
| *C04B 35/468* | (2006.01) |
| *H01G 4/012* | (2006.01) |

(52) U.S. Cl.
CPC ....... *H01G 4/1227* (2013.01); *C04B 35/4682* (2013.01); *H01G 4/008* (2013.01); *H01G 4/012* (2013.01); *H01G 4/30* (2013.01); *C04B 2235/3224* (2013.01); *C04B 2235/3267* (2013.01); *C04B 2235/3418* (2013.01); *C04B 2235/76* (2013.01)

(58) Field of Classification Search
CPC ...... H01G 4/008; H01G 4/012; H01G 4/1227; H01G 4/40; C04B 35/4682; C04B 2235/3224; C04B 2235/3418; C04B 2235/76

See application file for complete search history.

(56) References Cited

U.S. PATENT DOCUMENTS

| | | | |
|---|---|---|---|
| 2003/0013598 A1 | 1/2003 | Hagiwara et al. | |
| 2013/0258548 A1* | 10/2013 | Mizuno | H01G 4/30 361/301.4 |
| 2014/0285950 A1* | 9/2014 | Morita | H01G 4/012 361/321.2 |
| 2017/0287635 A1 | 10/2017 | Sakurai et al. | |
| 2017/0287636 A1 | 10/2017 | Sakurai et al. | |
| 2020/0051742 A1* | 2/2020 | Park | H01G 4/1218 |

FOREIGN PATENT DOCUMENTS

| | | |
|---|---|---|
| JP | 2002362971 A | 12/2002 |
| JP | 2017178684 A | 10/2017 |
| JP | 2017178685 A | 10/2017 |

* cited by examiner

*Primary Examiner* — Nathan Milakovich
(74) *Attorney, Agent, or Firm* — Law Office of Katsuhiro Arai (57) ABSTRACT

A dielectric substance includes a core-shell grain having a twin crystal structure. An interface of the twin crystal structure of the core-shell grain extends from a shell on one side, passes through a core, and extends to the shell on the other side.

19 Claims, 4 Drawing Sheets

DIELECTRIC SUBSTANCE, ELECTRONIC DEVICE AND MULTILAYER CERAMIC CAPACITOR

CROSS-REFERENCE TO RELATED APPLICATION

This application is based upon and claims the benefit of priority of the prior Japanese Patent Application No. 2020-082117, filed on May 7, 2020, the entire contents of which are incorporated herein by reference.

FIELD

A certain aspect of the present invention relates to a dielectric substance, an electronic device and a multilayer ceramic capacitor.

BACKGROUND

A thickness of dielectric layers of an electric device such as a multilayer ceramic capacitor is reduced and the number of the dielectric layers is increased, as the electronic device is downsized and the capacity of the electronic device is enlarged (for example, see Japanese Patent Application Publication No. 2017-178684, Japanese Patent Application Publication No. 2017-178685, and Japanese Patent Application Publication No. 2002-362971).

SUMMARY OF THE INVENTION

However, when the thickness of the dielectric layers is reduced, the DC electric field intensity applied to the dielectric layers increases. And so, improvement of reliability of the dielectric layers is requested.

The present invention has a purpose of providing a dielectric substance, an electronic device and a multilayer ceramic capacitor that are capable of improving reliability.

According to an aspect of the present invention, there is provided a dielectric substance including: a core-shell grain having a twin crystal structure, wherein an interface of the twin crystal structure of the core-shell grain extends from a shell on one side, passes through a core, and extends to the shell on the other side.

According to another aspect of the present invention, there is provided an electronic device including the dielectric substance.

According to another aspect of the present invention, there is provided a multilayer ceramic capacitor including: a multilayer structure in which each of dielectric layers and each of internal electrode layers are alternately stacked, each of the dielectric layers including a core-shell grain having a twin crystal structure, wherein an interface of the twin crystal structure of the core-shell grain extends from a shell on one side, passes through a core, and extends to the shell on the other side.

DETAILED DESCRIPTION

A description will be given of an embodiment with reference to the accompanying drawings.

Embodiment

Figure 1:
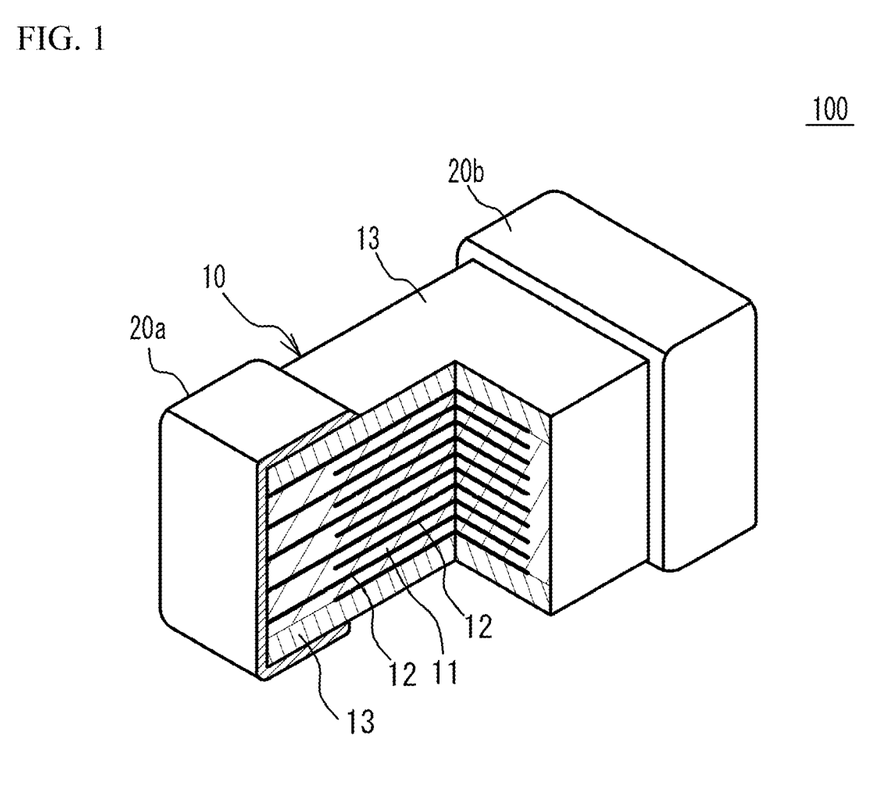
FIG. 1 illustrates a partial perspective view of a multilayer ceramic capacitor.

FIG. 1 illustrates a perspective view of a multilayer ceramic capacitor 100 in accordance with an embodiment, in which a cross section of a part of the multilayer ceramic capacitor 100 is illustrated. As illustrated in FIG. 1, the multilayer ceramic capacitor 100 includes a multilayer chip 10 having a rectangular parallelepiped shape, and a pair of external electrodes 20a and 20b that are respectively provided at two end faces of the multilayer chip 10 opposite to each other. In four faces other than the two end faces of the multilayer chip 10, two faces other than an upper face and a lower face of the multilayer chip 10 in a stacking direction are referred to as side faces. The external electrodes 20a and 20b extend to the upper face, the lower face and the two side faces. However, the external electrodes 20a and 20b are spaced from each other.

The multilayer chip 10 has a structure designed to have dielectric layers 11 and internal electrode layers 12 alternately stacked. A main component of the dielectric layer 11 is a ceramic material acting as a dielectric material. A main component of the internal electrode layers 12 is a metal material such as a base metal material. End edges of the internal electrode layers 12 are alternately exposed to a first end face of the multilayer chip 10 and a second end face of the multilayer chip 10 that is different from the first end face. In the embodiment, the first end face is opposite to the second end face. The external electrode 20a is provided on the first end face. The external electrode 20b is provided on the second end face. Thus, the internal electrode layers 12 are alternately conducted to the external electrode 20a and the external electrode 20b. Thus, the multilayer ceramic capacitor 100 has a structure in which a plurality of dielectric layers 11 are stacked and each two of the dielectric layers 11 sandwich the internal electrode layer 12. In a multilayer structure of the dielectric layers 11 and the internal electrode layers 12, the internal electrode layer 12 is positioned at an outermost layer in the stacking direction. The upper face and the lower face of the multilayer structure that are the internal electrode layers 12 are covered by cover layers 13. A main component of the cover layer 13 is a ceramic material. For example, a main component of the cover layer 13 is the same as that of the dielectric layer 11.

For example, the multilayer ceramic capacitor 100 may have a length of 0.25 mm, a width of 0.125 mm and a height of 0.125 mm. The multilayer ceramic capacitor 100 may have a length of 0.4 mm, a width of 0.2 mm and a height of 0.2 mm. The multilayer ceramic capacitor 100 may have a length of 0.6 mm, a width of 0.3 mm and a height of 0.3 mm. The multilayer ceramic capacitor 100 may have a length of 1.0 mm, a width of 0.5 mm and a height of 0.5 mm. The multilayer ceramic capacitor 100 may have a length of 3.2 mm, a width of 1.6 mm and a height of 1.6 mm. The multilayer ceramic capacitor 100 may have a length of 4.5 mm, a width of 3.2 mm and a height of 2.5 mm. However, the size of the multilayer ceramic capacitor 100 is not limited.

A main component of the internal electrode layers 12 is a base metal such as nickel (Ni), copper (Cu), tin (Sn) or the like. A noble metal such as platinum (Pt), palladium (Pd), silver (Ag), gold (Au) or an alloy thereof may be used as the internal electrode layers 12.

The dielectric layers 11 are mainly composed of a ceramic material that is expressed by a general formula $ABO_3$ and has a perovskite structure. The perovskite structure includes $ABO_{3-\alpha}$, having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $Ba_{1-x-y}Ca_xSr_yTi_{1-z}Zr_zO_3$ ($0 \leq x \leq 1$, $0 \leq y \leq 1$, $0 \leq z \leq 1$) having a perovskite structure.

The dielectric layers 11 includes an additive compound in addition to the main component ceramic material, in accordance with purposes. The additive compound may be an oxide of Mo (molybdenum), Nb (niobium), Ta (tantalum), W (tungsten), Mg (magnesium), Mn (manganese), V (vanadium), Cr (chromium), Zr (zirconium), or a rare earth element (Y (yttrium), Sm (samarium), Eu (europium), Gd (gadolinium), Tb (terbium), Dy (dysprosium), Ho (holmium), Er (erbium), Tm (thulium), Yb (ytterbium), or an oxide of Co (cobalt), Ni (nickel), Li (lithium), B (boron), Na (sodium), K (potassium) and Si (silicon), or glass.

Reduction of the thickness of the dielectric layers 11 and increasing of the stacked number of the dielectric layers 11 are requested, as the multilayer ceramic capacitor 100 is downsized and the capacity of the multilayer ceramic capacitor 100 is enlarged. However, when the thickness of the dielectric layers 11 is reduced, the DC electric field intensity in the dielectric layers 11 increases. Therefore, improvement of the reliability of the dielectric layers 11 is requested.

A description will be given of reliability of the dielectric layer 11. The dielectric layer 11 is formed by firing ceramic material powder of which main phase has a perovskite structure expressed by a general formula $ABO_3$. The ceramic material powder is exposed to reductive atmosphere during the firing. Therefore, oxygen vacancy occurs in $ABO_3$ of the ceramic material powder. During operation of the multilayer ceramic capacitor 100, a voltage is repeatedly applied to the dielectric layer 11. In this case, the oxygen vacancy migrates, and barrier may be broken. That is, the oxygen vacancy in of the perovskite structure is one of reasons of reliability degradation of the dielectric layer 11.

Figure 2A:
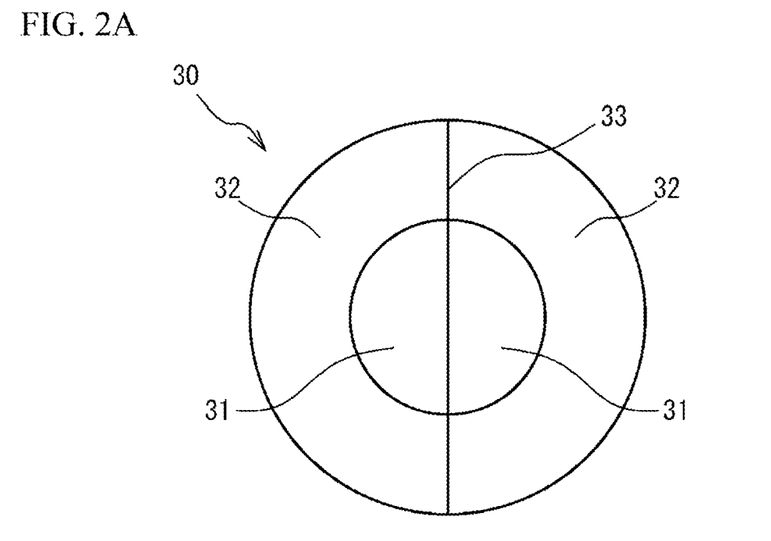
FIG. 2A illustrates a cross sectional view of a core-shell grain having a twin crystal structure.

And so, in the embodiment, at least a part of the crystal grains of the main component ceramic of the dielectric layers 11 has a core-shell structure in which both of a shell and a core have a twin crystal structure. FIG. 2A illustrates a cross sectional view of a core-shell grain 30 of the dielectric layers 11. In FIG. 2A, hatching is omitted. The core-shell grain 30 is a crystal grain of the main component ceramic of the dielectric layers 11. When the main component ceramic of the dielectric layers 11 is barium titanate, the core-shell grain 30 is a crystal grain of barium titanate.

As illustrated in FIG. 2A, the core-shell grain 30 has a core 31 having a spherical shape and a shell 32 surrounding and covering the core 31. The core 31 is a crystal portion in which no additive is solid-solved or the amount of the solid-solved additive is small. The shell 32 has a crystal portion in which the additive is solid-solved and the concentration of the additive is higher than that of the core 31.

The core-shell grain 30 has a twin crystal structure. An interface 33 of the twin crystal structure of the core-shell grain 30 extends from a grain boundary of the core-shell grain 30, passes through the shell 32 on the one side, the core 31 and the shell 32 on the other side, and reaches the grain boundary of the core-shell grain 30. In this manner, the interface 33 of the twin crystal of the core-shell grain 30 continuously extends from the grain boundary of the core-shell grain 30 on the one side, passes through the core 31 and reaches the grain boundary on the other side. In this manner, an area of the interface 33 is wide. In FIG. 2A, one line of the interface 33 is illustrated. However, a plurality of the interfaces 33 may be formed in banded shape. When the cross section of the core-shell grain 30 is observed, the grain boundary may be spaced from the interface of the twin crystal structure. In this case, the spaced distance may be 5 nm to 25 nm.

A distinguishing method between the core 31 and the shell 32 in the core-shell grain 30 is not limited. It is possible to distinguish between the core 31 and the shell 32 by thinning the dielectric layer 11 so that a face of the dielectric layer 11 can be observed with use of a STEM (Scanning Transmission Electron Microscope), observing a cross section with use of the STEM, obtaining an element mapping image with use of EDS (Energy dispersive X-ray spectroscopy), and confirming the contrast of the element mapping image. It is preferable that a plurality of fields are observed with 10000 magnification to 150000 magnification, from a viewpoint of observing with use of EDS. A calculation method of the cross section area of the core 31 and the shell 32 is not limited. For example, it is possible to calculate each of the cross section areas of the core 31 and the shell 32 by performing image processing of the element mapping image of 20 numbers of the core-shell grains 30 obtained by EDS, and counting the number of pixels of each of the area of the core 31 and the shell 32. When the total area of the core 31 and the shell 32 is calculated, it is preferable that the ratio of the core 31 is 20% to 95%. It is more preferable that the ratio of the core 31 is 40% to 85%. It is still more preferable that the ratio of the core 31 is 60% to 80%.

In the interface 33, atomic defects may be formed. Therefore, oxygen vacancies may be trapped in the interface 33. In the core-shell grain 30, the interface 33 is widely formed. Therefore, the performance of the trapping the oxygen vacancies is high. When the dielectric layers 11 include the core-shell grain 30, the reliability of the dielectric layers 11 is improved.

It is thought that the reliability of the dielectric layers 11 is secured by increasing the ratio of diffusive phases in the dielectric layers 11. The rare earth element is diffused into the main component ceramic of the diffusive phases. However, when the ratio of the diffusive phase is excessively large, the temperature characteristic may be degraded. On the other hand, when the core-shell grains 30 are formed in the dielectric layers 11, the reliability is improved. It is therefore possible to suppress the degradation of the temperature characteristic of the dielectric layers 11.

Figure 2B:
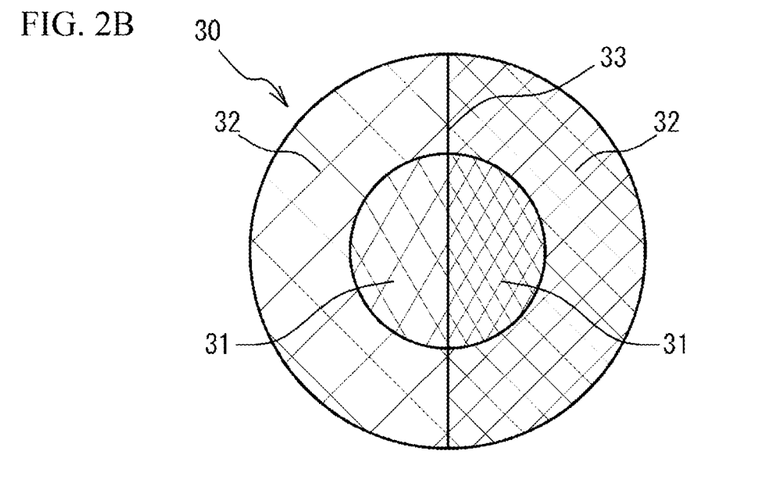
FIG. 2B illustrates a core-shell grain having a twin crystal structure observed by backscattered electron image.

It is possible to determine whether the core-shell grain has the twin crystal structure, by observing a backscattered electron image with use of a SEM (Scanning Electron Microscope). In the core-shell grain having the twin crystal structure, as illustrated in FIG. 2B, a contrast difference caused by different crystal orientations at an interface of the twin crystal and a concentric contrast difference caused by different compositions between the core and the shell are observed. Generally, it is possible to confirm the existence of the twin crystal structure by observing the crystal orientations of the twin crystal structure with use of a TEM (Transmission Electron Microscope). It is therefore possible to confirm the interface 33 by observing the SEM or the TEM. The object of the observation is a cross section of the core-shell grain.

Figure 2C:
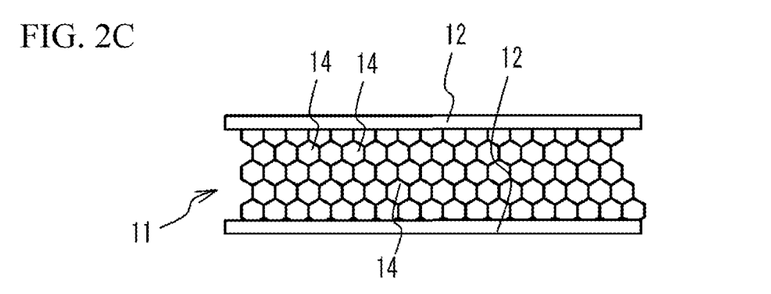
FIG. 2C schematically illustrates a cross section of a dielectric layer.

FIG. 2C schematically illustrates a cross section of the dielectric layers 11. As illustrated in FIG. 2C, the dielectric layers 11 have a plurality of crystal grains 14 of a main component ceramic. At least a part of the crystal grains 14 is the core-shell grain 30 of FIG. 2A.

When the ratio of the core-shell grain 30 in the dielectric layers 11 is small, sufficient trapping of the oxygen vacancies may not be necessarily achieved. And so, it is preferable that the ratio of all of the core-shell grains 30 in each of the dielectric layers 11 has a lower limit. For example, it is preferable that the ratio of the number of the core-shell grains 30 in all of the crystal grains 14 in each of the dielectric layers 11 is 2% or more. It is more preferable that the ratio is 8% or more. It is possible to calculate the ratio of the core-shell grains 30 by confirming 300 numbers of crystal grains which are randomly selected, in a plurality of fields of backscattered electron image of a SEM (scanning electron microscope) image with magnification of 10000 to 50000.

On the other hand, when the ratio of the core-shell grains 30 in each of the dielectric layers 11 is large, temperature characteristic may be degraded because of grain growth. And so, it is preferable that the ratio of all of the core-shell grains 30 in each of the dielectric layers 11 has an upper limit. For example, it is preferable that the ratio of all of the core-shell grains 30 in each of the dielectric layers 11 is 20% or less. It is more preferable that the ratio is 12% or less.

The rare earth element among the additive compounds of the dielectric layers 11 improves the reliability of the dielectric layers 11. And so, it is preferable that the rare earth element is added to the dielectric layers 11. It is therefore preferable that the added amount of the rare earth element in each of the dielectric layers 11 has a lower limit. On the other hand, when the added amount of the rare earth element in the dielectric layers 11 is large, the ratio of the diffusive phase in which the rare earth element is diffused into the main component ceramic is increases and the temperature characteristic of the multilayer ceramic capacitor 100 may be degraded. And so, it is preferable that the added amount of the rare earth element in the dielectric layers 11 has an upper limit. In the embodiment, it is preferable that the amount of the rare earth element Re (Re means at least one of the rare earth elements) is 1.75 mol % to 3.50 mol % on a presumption that the amount of the main component ceramic of the dielectric layers 11 is 100 mol % and the rare earth element is converted into $Re_2O_3$. It is more preferable that the amount of the rare earth element Re is 2.00 mol % to 2.75 mol %. It is still more preferable that the amount of the rare earth element Re is 2.25 mol % to 2.50 mol %. Even if $Re_2O_3$ is diffused during the firing of the multilayer chip 10, $Re_2O_3$ exists in any location. Therefore, $Re_2O_3$ is detected with the ratio when the multilayer structure between the two cover layers 13 is analyzed by ICP analysis.

Mg, V, Mn, Zr and Cr among the additive compounds of the dielectric layers 11 promote the sintering during firing of the dielectric layers 11. And so, it is preferable that the added amount of Mg, V, Mn, Zr and Cr in the dielectric layers 11 has a lower limit. On the other hand, the added amount of Mg and Zr in the dielectric layers 11 is large, the grain growth is suppressed and the forming of the twin crystal may be suppressed. When the added amount of Mg, V, Mn and Cr is large, reduction of lifetime caused by increasing of the oxygen vacancy concentration caused by the excessive amount of the acceptors may occur. When the added amount of V, Mn and Cr in the dielectric layers 11 is large, DC bias characteristic, aging characteristic or the like may be degraded. And so, it is preferable that the added amount of Mg, V, Mn, Zr and Cr in the dielectric layers 11 has an upper limit. In the embodiment, on a presumption that the amount of the main component ceramic of the dielectric layers 11 is 100 mol %, it is preferable that the total amount of the oxides of Mg, V, Mn, Zr and Cr is 0.02 mol % to 2.05 mol %, on a presumption that the oxides of Mg, V, Mn, Zr and Cr are converted into MgO, $MnO_2$, $ZrO_2$, $V_2O_5$ and $Cr_2O_3$. It is more preferable that the added amount is 0.10 mol % to 1.00 mol %. It is still more preferable that the added amount is 0.15 mol % to 0.80 mol %.

Si among the additive compounds added to the dielectric layers 11 acts as a sintering assistant and lowers the sintering temperature. And so, it is preferable that the added amount of Si in each of the dielectric layers 11 has a lower limit. On the other hand, when the added amount of Si to each of the dielectric layers 11 is large, the dielectric constant of the dielectric layers 11 may be reduced. And so, it is preferable that the added amount of Si in each of the dielectric layers 11 has an upper limit. In the embodiment, on a presumption that the amount of the main component ceramic of the dielectric layers 11 is 100 mol %, it is preferable that the amount of the oxide of Si is 0.25 mol % to 2.50 mol % on a presumption that the oxide of Si is converted into $SiO_2$. It is more preferable that the amount of the oxide of Si is 1.00 mol % to 2.00 mol %. It is still more preferable that the amount of the oxide of Si is 1.50 mol % to 1.80 mol %.

Figure 3:
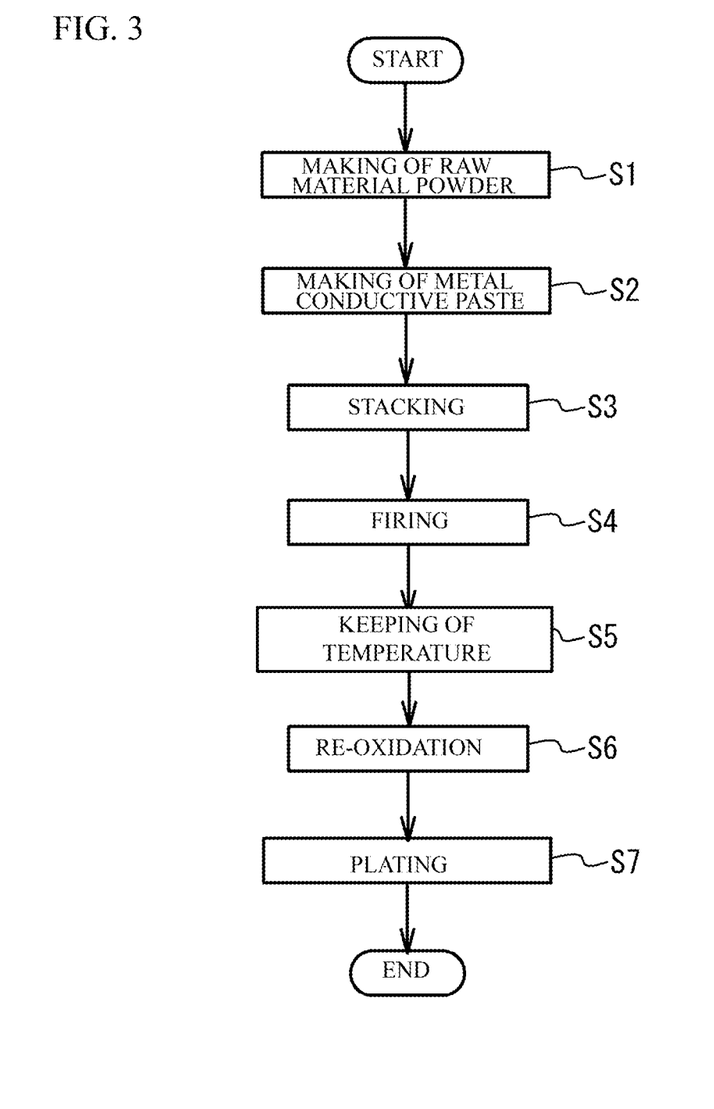
FIG. 3 illustrates a manufacturing method of a multilayer ceramic capacitor.

A description will be given of a manufacturing method of the multilayer ceramic capacitor 100. FIG. 3 illustrates a manufacturing method of the multilayer ceramic capacitor 100.

(Making process of a raw material powder) (S1) An A site element and a B site element of the dielectric layer 11 are generally included in the dielectric layer 11 in a shape of sintered structure of grains of $ABO_3$. For example, $BaTiO_3$ is tetragonal compound having a perovskite structure and has a high dielectric constant. $BaTiO_3$ can be obtained by reacting a titanium material such as titanium dioxide with a barium material such as barium carbonate and synthesizing barium titanate. Various methods are known as a synthesizing ceramic of the dielectric layer 11. For example, a solid-phase method, a sol-gel method, a hydrothermal method and so on are known. In the embodiment, any one of them can be adopted.

Next, additive compound may be added to a ceramic powder material, in accordance with purposes. The additive compound may be an oxide of Mo, Nb, Ta, W, Mg, Mn, V, Cr or a rare earth element (Y, Sm, Eu, Gd, Tb, Dy, Ho, Er, Tm, Yb, or an oxide of Co, Ni, Li, B, Na, K and Si, or glass.

For example, it is preferable that an average particle diameter of the ceramic powder is 50 nm to 300 nm from a viewpoint of reducing the thickness of the dielectric layers 11. For example, the particle diameter of the resulting ceramic may be adjusted by crushing the resulting ceramic powder. Alternatively, the grain diameter may be adjusted by performing the crushing and a classifying process. With the processes, the dielectric material is obtained.

(Making process of metal conductive paste) (S2) Metal conductive paste is made by mixing a metal material, a co-material and an organic binder. From a viewpoint of reducing the thickness of the internal electrode layers 12, the metal material has a small particle diameter. In the embodiment, the metal material is metals of which an average particle diameter is 120 nm or less (for example, Ni). Ceramic particles acting as the co-material are added to the metal conductive paste. A main component ceramic of the ceramic particles is not limited. It is preferable that the main component ceramic of the ceramic particles is the same as the main component ceramic of the dielectric layer 11. Therefore, the co-material is barium titanate or the like.

Figure 4A:
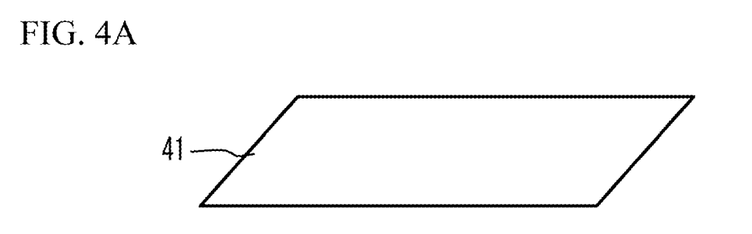
FIG. 4A to FIG. 4C illustrate a stacking process.

(Stacking Process) (S3) Next, a binder such as polyvinyl butyral (PVB) resin, an organic solvent such as ethanol or toluene, and a plasticizer are added to the resulting dielectric material and wet-blended. As illustrated in FIG. 4A, with use of the resulting slurry, a strip-shaped dielectric green sheet 41 with a thickness of 0.8 µm or less is painted on a base material by, for example, a die coater method or a doctor blade method, and then dried. In FIG. 4A, the base material is not illustrated.

Figure 4B:
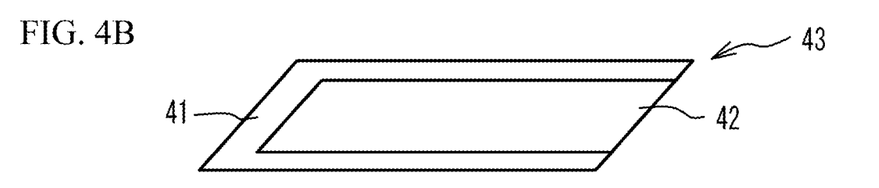

Next, as illustrated in FIG. 4B, metal conductive paste 42 for the internal electrode layer is formed on the surface of the dielectric green sheet 41 with use of screen printing or gravure printing. The metal conductive paste 42 contains an organic binder. Thus, a sheet member 43 is obtained.

Figure 4C:
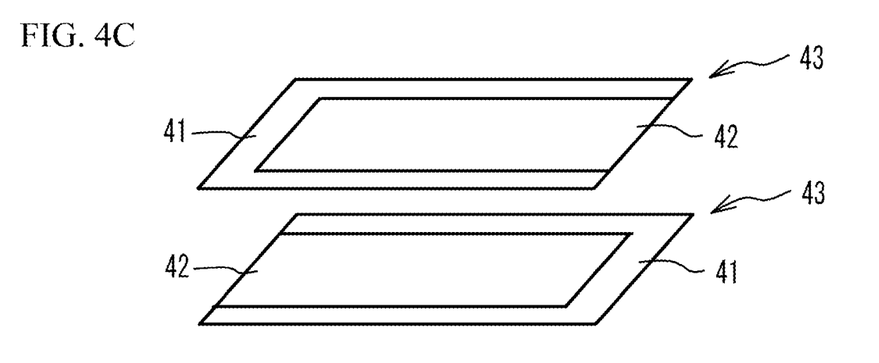

Thereafter, as illustrated in FIG. 4C, a predetermined number of the sheet members 43 are stacked while the base material is peeled so that the end edges of the metal conductive paste 42 are alternately exposed to both edge faces in the length direction of the dielectric green sheet 41. For example, 100 to 500 stack units are stacked. Thereafter, cover sheets, which are to be the cover layers 13, are compressed on and under the multilayer structure of the stacked sheet members 43 to obtain a ceramic multilayer structure. After that, both end faces of the ceramic multilayer structure are coated with metal conductive paste to be the external electrodes 20a and 20b by a dipping method. After that, the metal conductive paste is dried. Thus, a compact for forming the multilayer ceramic capacitor 100 is obtained.

The metal conductive paste 42 corresponding to the internal electrode layers 12 may be printed on a plurality of regions of a single dielectric green sheet 41. In this case, the stacked sheet members 43 are stacked. Cover sheets are clamped. After that, the stacked sheet members 43 is cut into chips having a predetermined size (for example, 1.0 mm×0.5 mm). Metal conductive paste acting as base layers of the external electrodes 20a and 20b is applied to both end faces of the chips by a dipping method or the like and is dried.

(Firing process) (S4) Next, after removing the binder in N2 atmosphere at 250 degrees C. to 500 degrees C., the resulting compact is fired for ten minutes to 2 hours in a reductive atmosphere, of which an oxygen partial pressure is $10^{-5}$ to $10^{-8}$ atm, in a temperature range of 1100 degrees C. to 1300 degrees C.

(Temperature keeping process) (S5) After that, the resulting compact was kept for 20 minutes at a temperature which is lower than the maximum temperature of the firing process by 300 degrees C. (for example, 880 degrees C.) in a reductive atmosphere of which the oxygen partial pressure is higher than that of the firing process. After that, the resulting compact is cooled. Thus, a sintered structure is obtained.

(Re-oxidizing process) (S6) After that, a re-oxidizing process may be performed at 600 degrees C. to 1000 degrees C. in $N_2$ gas atmosphere.

(Plating process) (S7) After that, metal layers such as Cu, Ni or Su are applied to the ground layers of the external electrodes 20a and 20b by a plating process.

In the manufacturing method of the embodiment, after the firing process, the temperature keeping process for keeping the temperature lower than the maximum temperature of the firing process for a predetermined time is performed. After that, cooling is performed. In this case, the grain growth of the main component ceramic of the dielectric material is promoted. It is therefore possible to form the core-shell grain 30 in the dielectric layer 11.

It is preferable that the temperature and the time of the temperature keeping process are adjusted in accordance with the degree of the grain growth of the main component ceramic. For example, it is preferable that the temperature and the time of the temperature keeping process are adjusted so that the average crystal grain diameter of the crystal grains 14 in the dielectric layer 11 is three times or more as the average particle diameter of the main component ceramic of the dielectric material. When, as an additive compound, an oxide of Mg for suppressing the grain growth is added to the dielectric material, it is preferable that the added amount of the oxide of Mg is considered.

In the above embodiment, the multilayer ceramic capacitor has been described as an example of the ceramic electronic component. However, the ceramic electronic component is not limited to the multilayer ceramic capacitor. For example, the ceramic electronic component may be other electronic components such as a varistor and a thermistor.

[Examples]

In an example 1, each material was weighed so that the amount of the oxides of Ba and Ti was 100 mol % when converted into $BaTiO_3$, the amount of the oxide of Dy was 2.00 mol % when converted into $Dy_2O_3$, the amount of the oxide of Mg was 0.10 mol % when converted into MgO, the amount of the oxide of V was 0.075 mol % when converted into $V_2O_5$, the amount of the oxide of Si was 1.50 mol % when converted into $SiO_2$. The materials were wet-blended and crushed into mixture in a ball mill for 15 hours to 24 hours.

Next, the mixed materials were dried and calcined in an air at 800 degrees C. Therefore, the calcined powder was obtained. The average particle diameter of the calcined particle was 97 nm. The calcined powder was wet-crushed in ethanol and was dried. An organic binder and a solvent were added to the resulting calcined powder. The resulting slurry was formed into the ceramic green sheet having the thickness of 4 µm by a doctor blade method. Next, an internal electrode pattern was printed on the ceramic green sheet with use of conductive paste of which a main component was Ni powder. 10 numbers of the sheets were stacked and was thermally clamped. Thus, a multilayer structure was obtained. The multilayer structure was stamped into 1005 shape (length 1.0 mm×width 0.5 mm×height 0.5 mm). the multilayer structure having a chip shape was obtained. Next, Ni external electrodes were formed on the chip-shaped multilayer structure. The binder was removed from the resulting chip-shaped multilayer structure in N2 atmosphere. The chip-shaped multilayer structure was heated for 15 minutes at 1200 degrees C. in a partial oxygen pressure of $10^{-5}$ to $10^{-8}$ atm. After that, as the temperature keeping process, the chip-shaped multilayer structure was held for 20 minutes at 800 degrees C. in the partial oxygen pressure of 10' to $10^{-7}$ atm. After that, the chip-shaped multilayer structure was cooled. And the chip-shaped sintered structure was obtained. Next, the chip-shaped sintered structure was subjected to the re-oxidation process at 800 degrees C. to 1000 degrees C. in N2 atmosphere. Thus, the multilayer ceramic capacitor was obtained. The thickness of one layer of the multilayer ceramic capacitor was approximately 3 µm. The average crystal grain diameter of the crystal grains 14 in the sintered structure was 352 nm which was three times or more as the size of the material powder.

Next, the multilayer ceramic capacitor was buried in epoxy resin. The multilayer ceramic capacitor was grinded so that an intersection portion of the internal electrodes was exposed. The back scattered electron image obtained by SEM with respect to the dielectric layer between the internal electrode layers was observed. The ratio of the core-shell grains 30 in 300 number of the crystal grains 14 which were randomly selected from the back scattered electron image was obtained.

(Example 2) In an example 2, the firing temperature was higher than that of the example 1 by 20 degrees C. Other conditions were the same as those of the example 1. In the example 2, the average particle diameter of the calcined powder was 97 nm. The average crystal grain diameter of the crystal grains 14 was 467 nm.

(Example 3) In an example 3, the average particle diameter of $BaTiO_3$ was larger than that of the example 1 by 20 nm. Other conditions were the same as those of the example 1. In the example 3, the average particle diameter of the calcined powder was 122 nm. The average crystal grain diameter of the crystal grains 14 was 263 nm.

(Example 4) In an example 4, the firing temperature was higher than that of the example 3 by 20 degrees C. Other conditions were the same as those of the example 3. In the example 4, the average particle diameter of the calcined powder was 122 nm. The average crystal grain diameter of the crystal grains 14 was 315 nm.

(Example 5) In an example 5, the firing temperature was higher than that of the example 4 by 20 degrees C. Other conditions were the same as those of the example 1. In the example 5, the average particle diameter of the calcined powder was 122 nm. The average crystal grain diameter of the crystal grains 14 was 417 nm.

(Example 6) In an example 6, the average particle diameter of $BaTiO_3$ was larger than that of the example 1 by 120 nm. Other conditions were the same as those of the example 2. In the example 6, the average particle diameter of the calcined powder was 218 nm. The average crystal grain diameter of the crystal grains 14 was 316 nm.

(Comparative example 1) In a comparative example 1, the process for keeping the temperature for 20 minutes at 880 degrees C. was not performed and the cooling was performed from the maximum temperature of the firing process, compared with the example 6. Other conditions were the same as those of the example 1. In the comparative example 1, the average particle diameter of the calcined powder was 218 nm. The average crystal grain diameter of the crystal grains 14 was 254 nm.

(Comparative example 2) In a comparative example 2, the process for keeping the temperature for 20 minutes at 880 degrees C. was not performed and the cooling was performed from the maximum temperature of the firing process, compared with the example 1. The average particle diameter of $BaTiO_3$ was larger than that of the example 1, by 220 nm. Other conditions were the same as those of the example 2. In the comparative example 2, the average particle diameter of the calcined powder was 321 nm. The average crystal grain diameter of the crystal grains 14 was 343 nm.

(Comparative example 3) In a comparative example 3, the firing temperature was higher than that of the comparative example 2 by 20 degrees C. Other conditions were the same as those of the comparative example 2. In the comparative example 3, the average particle diameter of the calcined powder was 321 nm. The average crystal grain diameter of the crystal grains 14 was 387 nm.

In the example 1, the ratio of the number of the core-shell grains 30 with respect to all of the crystal grains 14 in the dielectric layers 11 was 15.9%. In the example 2, the ratio was 23.7%. In the example 3, the ratio was 2.7%. In the example 4, the ratio was 8.5%. In the example 5, the ratio was 21.4%. In the example 6, the ratio was 0.6%. In the comparative examples 1 to 3, the core-shell grains 30 were not formed. That is, in the comparative examples 1 to 3, the ratio was 0%. Table 1 shows the results.

TABLE 1

|  | AVERAGE PARTICLE DIAMETER (nm) | AVERAGE GRAIN DIAMETER (nm) | RATIO OF CORE-SHELL (%) | MTTF (min) | LIFE TIME | CAPACITY CHANGING RATE (%) |
|---|---|---|---|---|---|---|
| EXAMPLE 1 | 97 | 352 | 15.9 | 4081 | ◯ | −31.4 |
| EXAMPLE 2 | 97 | 457 | 23.7 | 7317 | ◯ | −45.2 |
| EXAMPLE 3 | 122 | 263 | 2.7 | 2335 | ◯ | −28.6 |
| EXAMPLE 4 | 122 | 315 | 8.5 | 5129 | ◯ | −30.7 |
| EXAMPLE 5 | 122 | 417 | 21.4 | 6399 | ◯ | −38.4 |
| EXAMPLE 6 | 218 | 316 | 0.6 | 825 | ◯ | −26.1 |
| COMPARATIVE EXAMPLE 1 | 218 | 254 | 0 | 380 | X | −11.9 |
| COMPARATIVE EXAMPLE 2 | 321 | 343 | 0 | 126 | X | −19.2 |
| COMPARATIVE EXAMPLE 3 | 321 | 387 | 0 | 362 | X | −24.6 |

(Measuring test of life time) Next, the life time was measured with respect to each of the examples 1 to 6 and the comparative examples 1 to 3. When the life time was 800 minutes or more under an accelerated condition of 150 degrees C. and −240 V, the sample was determined as good "◯". When the life time was less than 800 minutes, the sample was determined as bad "X".

The comparative examples 1 to 3 were determined as bad "x" in the measuring test of life time. It is thought that this was because the core-shell grains 30 were not included in the dielectric layers 11, and the oxygen vacancies were not trapped. On the other hand, the examples 1 to 6 were determined as good "◯" in the measuring test of life time. It is thought that this was because the core-shell grains 30 were included in the dielectric layers 11 and the oxygen vacancies were trapped.

It was confirmed that the life time got longer when the ratio of the number of the core-shell grains 30 with respect to all of the crystal grains 14 in the dielectric layers 11 increased. It was confirmed that the ratio was preferably 2% or more in order to elongate the life time to 1000 minutes or more.

(Temperature changing rate) Next, a temperature changing rate was measured, with respect to each of the examples 1 to 6 and the comparative examples 1 to 3. A capacity changing rate at 125 degrees C. with respect to a standard capacity at 25 degrees C. was measured. When the capacity changing rate was −33% or more, the sample was determined as good.

The capacity changing rate of the examples 2 and 5 was less than −33%. However, the examples 1, 3, 4 and 6 were determined as good. It is thought that this was because the ratio of the core-shell grains 30 in the dielectric layer 11 was 20% or less. Even if the capacity changing rate is less than −33%, the sample can be used as a product when an upper limit of the temperature compensation range is reduced to 105 degrees C. or 85 degrees C. from 125 degrees C.

From the results, it was confirmed that the ratio of the core-shell grain 30 was preferably 2% or more and 20 or less in the dielectric layer 11. It was confirmed that the ratio of the core-shell grain 30 was preferably 5% to 16% in the dielectric layer 11 from a viewpoint of achieving more preferable capacity changing rate and more preferable life time characteristic.

(Example 7) In an example 7, another rare earth element other than Dy was added. In the example 7, each material was weighed so that the amount of the oxides of Ba and Ti was 100 mol % when converted into $BaTiO_3$, the amount of the oxide of Ho was 1.75 mol % when converted into Ho2O3, the amount of the oxide of Mg was 0.15 mol % when converted into MgO, the amount of the oxide of V was 0.05 mol % when converted into $V_2O_5$, the amount of the oxide of Si was 1.50 mol % when converted into $SiO_2$. The materials were wet-blended and crushed into mixture in a ball mill for 15 hours to 24 hours. In the example 7, the average particle diameter of the calcined powder was 115 nm. The average crystal grain diameter of the sintered structures was 317 nm. Other conditions were the same as those of the example 1.

(Example 8) In an example 8, each material was weighed so that the amount of the oxides of Ba and Ti was 100 mol % when converted into $BaTiO_3$, the amount of the oxide of Ho was 2.00 mol % when converted into $Ho_2O_3$, the amount of the oxide of Mg was 0.15 mol % when converted into MgO, the amount of the oxide of V was 0.05 mol % when converted into $V_2O_5$, the amount of the oxide of Si was 1.50 mol % when converted into $SiO_2$. The materials were wet-blended and crushed into mixture in a ball mill for 15 hours to 24 hours. In the example 8, the average particle diameter of the calcined powder was 115 nm. The average crystal grain diameter of the sintered structures was 422 nm. Other conditions were the same as those of the example 1.

(Example 9) In an example 9, each material was weighed so that the amount of the oxides of Ba and Ti was 100 mol % when converted into $BaTiO_3$, the amount of the oxide of Ho was 2.50 mol % when converted into $Ho_2O_3$, the amount of the oxide of Mn was 0.15 mol % when converted into $MnO_2$, the amount of the oxide of V was 0.05 mol % when converted into $V_2O_5$, the amount of the oxide of Si was 1.50 mol % when converted into $SiO_2$. The materials were wet-blended and crushed into mixture in a ball mill for 15 hours to 24 hours. In the example 8, the average particle diameter of the calcined powder was 115 nm. The average crystal grain diameter of the sintered structures was 342 nm. Other conditions were the same as those of the example 1.

(Example 10) In an example 10, each material was weighed so that the amount of the oxides of Ba and Ti was 100 mol % when converted inti $BaTiO_3$, the amount of the oxide of Ho was 2.50 mol % when converted into $Ho_2O_3$, the amount of the oxide of Zr was 0.15 mol % when converted into $ZrO_2$, the amount of the oxide of V was 0.05 mol % when converted into $V_2O_5$, the amount of the oxide of Si was 1.50 mol % when converted into $SiO_2$. The materials were wet-blended and crushed into mixture in a ball mill for 15 hours to 24 hours. In the example 10, the average particle diameter of the calcined powder was 115 nm. The average crystal grain diameter of the sintered structures was 252 nm. Other conditions were the same as those of the example 1.

(Example 11) In an example 11, each material was weighed so that the amount of the oxides of Ba and Ti was 100 mol % when converted into $BaTiO_3$, the amount of the oxide of Ho was 2.50 mol % when converted into $Ho_2O_3$, the amount of the oxide of Mg was 0.15 mol % when converted into MgO, the amount of the oxide of Cr was 0.05 mol % when converted into $Cr_2O_3$, the amount of the oxide of Si was 1.50 mol % when converted into $SiO_2$. The materials were wet-blended and crushed into mixture in a ball mill for 15 hours to 24 hours. In the example 11, the average particle diameter of the calcined powder was 115 nm. The average crystal grain diameter of the sintered structures was 316 nm. Other conditions were the same as those of the example 1.

(Example 12) In an example 12, each material was weighed so that the amount of the oxides of Ba and Ti was 100 mol % when converted into $BaTiO_3$, the amount of the oxide of Y was 1.75 mol % when converted into $Y_2O_3$, the amount of the oxide of Ho was 1.75 mol % when converted into $Ho_2O_3$, the amount of the oxide of Mg was 0.15 mol % when converted into MgO, the amount of the oxide of V was 0.05 mol % when converted into $V_2O_5$, the amount of the oxide of Si was 1.50 mol % when converted into $SiO_2$. The materials were wet-blended and crushed into mixture in a ball mill for 15 hours to 24 hours. In the example 12, the average particle diameter of the calcined powder was 127 nm. The average crystal grain diameter of the sintered structures was 328 nm. Other conditions were the same as those of the example 1.

(Example 13) In an example 13, each material was weighed so that the amount of the oxides of Ba and Ti was 100 mol % when converted into $BaTiO_3$, the amount of the oxide of Y was 1.00 mol % when converted into $Y_2O_3$, the amount of the oxide of Ho was 1.75 mol % when converted into $Ho_2O_3$, the amount of the oxide of Mg was 0.15 mol % when converted into MgO, the amount of the oxide of V was 0.05 mol % when converted into $V_2O_5$, the amount of the oxide of Si was 1.50 mol % when converted into $SiO_2$. The materials were wet-blended and crushed into mixture in a ball mill for 15 hours to 24 hours. In the example 13, the average particle diameter of the calcined powder was 127 nm. The average crystal grain diameter of the sintered structures was 387 nm. Other conditions were the same as those of the example 1.

(Example 14) In an example 14, each material was weighed so that the amount of the oxides of Ba and Ti was 100 mol % when converted into $BaTiO_3$, the amount of the oxide of Ho was 2.50 mol % when converted into $Ho_2O_3$, the amount of the oxide of Mn was 0.50 mol % when converted into $MnO_2$, the amount of the oxide of V was 0.05 mol % when converted into $V_2O_5$, the amount of the oxide of Si was 1.20 mol % when converted into $SiO_2$. The materials were wet-blended and crushed into mixture in a ball mill for 15 hours to 24 hours. In the example 14, the average particle diameter of the calcined powder was 115 nm. The average crystal grain diameter of the sintered structures was 284 nm. Other conditions were the same as those of the example 1.

(Example 15) In an example 15, each material was weighed so that the amount of the oxides of Ba and Ti was 100 mol % when converted into $BaTiO_3$, the amount of the oxide of Ho was 2.50 mol % when converted into $Ho_2O_3$, the amount of the oxide of Mn was 1.50 mol % when converted into $MnO_2$, the amount of the oxide of V was 0.05 mol % when converted into $V_2O_5$, the amount of the oxide of Si was 1.00 mol % when converted into $SiO_2$. The materials were wet-blended and crushed into mixture in a ball mill for 15 hours to 24 hours. In the example 15, the average particle diameter of the calcined powder was 115 nm. The average crystal grain diameter of the sintered structures was 237 nm. Other conditions were the same as those of the example 1.

(Example 16) In an example 16, each material was weighed so that the amount of the oxides of Ba and Ti was 100 mol % when converted into $BaTiO_3$, the amount of the oxide of Ho was 2.50 mol % as $Ho_2O_3$, the amount of the oxide of Mg was 2.00 mol % when converted into MgO, the amount of the oxide of V was 0.05 mol % when converted into $V_2O_5$, the amount of the oxide of Si was 1.20 mol % when converted into $SiO_2$. The materials were wet-blended and crushed into mixture in a ball mill for 15 hours to 24 hours. In the example 16, the average particle diameter of the calcined powder was 115 nm. The average crystal grain diameter of the sintered structures was 251 nm. Other conditions were the same as those of the example 1.

(Comparative example 4) In a comparative example 4, each material was weighed so that the amount of the oxides of Ba and Ti was 100 mol % when converted into $BaTiO_3$, the amount of the oxide of Ho was 3.50 mol % when converted into $Ho_2O_3$, the amount of the oxide of Mn was 0.15 mol % when converted into $MnO_2$, the amount of the oxide of V was 0.05 mol % when converted into $V_2O_5$, the amount of the oxide of Si was 1.70 mol % when converted into $SiO_2$. The materials were wet-blended and crushed into mixture in a ball mill for 15 hours to 24 hours. In the comparative example 4, the process of keeping the temperature for 20 minutes at 880 degrees C. was not performed. The cooling was performed from the maximum temperature of the firing process. Other conditions were the same as those of the example 1. In the comparative example 4, the average particle diameter of the calcined powder was 253 nm. The average crystal grain diameter of the sintered structures was 302 nm.

(Comparative example 5) In a comparative example 5, each material was weighed so that the amount of the oxides of Ba and Ti was 100 mol % when converted into $BaTiO_3$, the amount of the oxide of Ho was 2.50 mol % when converted into $Ho_2O_3$, the amount of the oxide of Zr was 0.10 mol % when converted into $ZrO_2$, the amount of the oxide of V was 0.05 mol % when converted into $V_2O_5$, the amount of the oxide of Si was 1.90 mol % when converted into $SiO_2$. The materials were wet-blended and crushed into mixture in a ball mill for 15 hours to 24 hours. In the comparative example 5, the process of keeping the temperature for 20 minutes at 880 degrees C. was not performed. The cooling was performed from the maximum temperature of the firing process. Other conditions were the same as those of the example 1. In the comparative example 5, the average particle diameter of the calcined powder was 253 nm. The average crystal grain diameter of the sintered structures was 284 nm.

(Comparative example 6) In a comparative example 6, each material was weighed so that the amount of the oxides of Ba and Ti was 100 mol % when converted into $BaTiO_3$, the amount of the oxide of Y was 1.75 mol % when converted into $Y_2O_3$, the amount of the oxide of Ho was 1.75 mol % when converted into $Ho_2O_3$, the amount of the oxide of Mg was 0.075 mol % when converted into MgO, the amount of the oxide of V was 0.05 mol % as $V_2O_5$, the amount of the oxide of Si was 1.80 mol % when converted into $SiO_2$. The materials were wet-blended and crushed into mixture in a ball mill for 15 hours to 24 hours. In the comparative example 6, the process of keeping the temperature for 20 minutes at 880 degrees C. was not performed. The cooling was performed from the maximum temperature of the firing process. Other conditions were the same as those of the example 1. In the comparative example 6, the average particle diameter of the calcined powder was 252 nm. The average crystal grain diameter of the sintered structures was 279 nm.

In the example 7, the ratio of the core-shell grains 30 with respect to all crystal grains 14 in the dielectric layers 11 was 9.7%. In the example 8, the ratio was 18.1%. In the example 9, the ratio was 10.2%. In the example 10, the ratio was 3.2%. In the example 11, the ratio was 7.4%. In the example 12, the ratio was 8.5%. In the example 13, the ratio was 17.5%. In the example 14, the ratio was 8.1%. In the example 15, the ratio was 2.2%. In the example 16, the ratio was 2.9%. In the comparative examples 4 to 6, the core-shell grains 30 were not formed. That is, the ratio was 0% in the comparative examples 4 to 6. Table 2 and Table 3 show the results.

TABLE 2

| | FIRST ADDITVE | | SECOND ADDITVE | | AMOUNT |
|---|---|---|---|---|---|
| | TYPE | AMOUNT (mol %) | TYPE | AMOUNT (mol %) | OF $SiO_2$ (mol %) |
| EXAMPLE 7 | $Ho_2O_3$ | 1.75 | MgO | 0.15 | 1.50 |
| | | | $V_2O_5$ | 0.05 | |
| EXAMPLE 8 | $Ho_2O_3$ | 2.00 | MgO | 0.15 | 1.50 |
| | | | $V_2O_5$ | 0.05 | |
| EXAMPLE 9 | $Ho_2O_3$ | 2.50 | $MnO_2$ | 0.15 | 1.50 |
| | | | $V_2O_5$ | 0.05 | |
| EXAMPLE 10 | $Ho_2O_3$ | 2.50 | $ZrO_2$ | 0.15 | 1.50 |
| | | | $V_2O_5$ | 0.05 | |
| EXAMPLE 11 | $Ho_2O_3$ | 2.50 | MgO | 0.15 | 1.50 |
| | | | $Cr_2O_3$ | 0.05 | |
| EXAMPLE 12 | $Y_2O_3$ | 1.75 | MgO | 0.15 | 1.50 |
| | $Ho_2O_3$ | 1.75 | $V_2O_5$ | 0.05 | |
| EXAMPLE 13 | $Y_2O_3$ | 1.00 | MgO | 0.15 | 1.50 |
| | $Ho_2O_3$ | 1.75 | $V_2O_5$ | 0.05 | |
| EXAMPLE 14 | $Ho_2O_3$ | 2.50 | $MnO_2$ | 0.50 | 1.20 |
| | | | $V_2O_5$ | 0.05 | |
| EXAMPLE 15 | $Ho_2O_3$ | 2.50 | $MnO_2$ | 1.50 | 1.00 |
| | | | $V_2O_5$ | 0.05 | |
| EXAMPLE 16 | $Ho_2O_3$ | 2.50 | MgO | 2.00 | 1.20 |
| | | | $V_2O_5$ | 0.05 | |
| COMPARATIVE EXAMPLE 4 | $Ho_2O_3$ | 3.50 | $MnO_2$ | 0.15 | 1.70 |
| | | | $V_2O_5$ | 0.05 | |
| COMPARATIVE EXAMPLE 5 | $Ho_2O_3$ | 2.50 | $ZrO_2$ | 0.10 | 1.90 |
| | | | $V_2O_5$ | 0.05 | |
| COMPARATIVE EXAMPLE 6 | $Y_2O_3$ | 1.75 | MgO | 0.075 | 1.80 |
| | $Ho_2O_3$ | 1.75 | $V_2O_5$ | 0.05 | |

TABLE 3

| | AVERAGE PARTICLE DIAMETER (nm) | AVERAGE GRAIN DIAMETER (nm) | RATIO OF CORE-SHELL (%) | MTTF (min) | LIFE TIME | CAPACITY CHANGING RATE (%) |
|---|---|---|---|---|---|---|
| EXAMPLE 7 | 115 | 317 | 9.7 | 2011 | ○ | −28.3 |
| EXAMPLE 8 | 115 | 422 | 18.1 | 6858 | ○ | −32.9 |
| EXAMPLE 9 | 115 | 342 | 10.2 | 2560 | ○ | −28.5 |
| EXAMPLE 10 | 115 | 252 | 3.2 | 1209 | ○ | −21.2 |
| EXAMPLE 11 | 115 | 316 | 7.4 | 1945 | ○ | −26.1 |
| EXAMPLE 12 | 127 | 328 | 8.5 | 2831 | ○ | −28.9 |
| EXAMPLE 13 | 127 | 387 | 17.5 | 7099 | ○ | −32.4 |
| EXAMPLE 14 | 115 | 284 | 8.1 | 1610 | ○ | −24.2 |
| EXAMPLE 15 | 115 | 237 | 2.2 | 955 | ○ | −21.1 |
| EXAMPLE 16 | 115 | 251 | 2.9 | 882 | ○ | −20.4 |
| COMPARATIVE EXAMPLE 4 | 253 | 302 | 0 | 561 | X | −21.1 |
| COMPARATIVE EXAMPLE 5 | 253 | 284 | 0 | 366 | X | −19.4 |
| COMPARATIVE EXAMPLE 6 | 252 | 279 | 0 | 650 | X | −23.5 |

(Measuring test of life time) Next, the life time was measured with respect to each of the examples 7 to 16 and the comparative examples 4 to 6. When the life time was 800 minutes or more under an accelerated condition of 150 degrees C. and −240 V, the sample was determined as good "○". When the life time was less than 800 minutes, the sample was determined as bad "X".

The comparative examples 4 to 6 were determined as bad "x" in the measuring test of life time. It is thought that this was because the core-shell grains 30 were not included in the dielectric layers 11, and the oxygen vacancies were not trapped. On the other hand, the examples 7 to 16 were determined as good "○" in the measuring test of life time. It is thought that this was because the core-shell grains 30 were included in the dielectric layers 11 and the oxygen vacancies were trapped.

It was confirmed that the life time got longer when the ratio of the number of the core-shell grains 30 with respect to all of the crystal grains 14 in the dielectric layers 11 increased. It was confirmed that the ratio was preferably 2% or more in order to elongate the life time to 1000 minutes or more.

(Temperature changing rate) Next, a temperature changing rate was measured, with respect to each of the examples 7 to 16 and the comparative examples 4 to 6. A capacity changing rate at 125 degrees C. with respect to a standard capacity at 25 degrees C. was measured. When the capacity changing rate was −33% or more, the sample was determined as good.

The examples 7-16 were determined as good. It is thought that this was because the ratio of the core-shell grains 30 in the dielectric layer 11 was 20% or less.

From the results, it was confirmed that the ratio of the core-shell grain 30 was preferably 2% or more and 20 or less in the dielectric layer 11. It was confirmed that the ratio of the core-shell grain 30 was preferably 5% to 16% in the dielectric layer 11 from a viewpoint of achieving more preferable capacity changing rate and more preferable life time characteristic.

It was confirmed that 1.75 mol % to 3.50 mol % of the oxide of Re was added to the dielectric layer 11 on a presumption that the amount of the main component ceramic of the dielectric layer 11 was 100 mol % and the oxide of Re was converted into $Re_2O_3$. It was confirmed that 0.02 mol % to 2.05 mol % of the total amount of the oxides of Mg, V, Mn, Zr and Cr was added to the dielectric layer 11 on a presumption that the amount of the main component ceramic of the dielectric layers 11 was 100 mol % and the oxides of Mg, V, Mn, Zr and Cr were converted into MgO, $MnO_2$, $ZrO_2$, $V_2O_5$ and $Cr_2O_3$. It was confirmed that 0.25 mol % to 2.50 mol % of the oxide of Si was added to the dielectric layer 11 on a presumption that the amount of the main component ceramic of the dielectric layer 11 was 100 mol % and the oxide of Si was converted into $SiO_2$.

Although the embodiments of the present invention have been described in detail, it is to be understood that the various change, substitutions, and alterations could be made hereto without departing from the spirit and scope of the invention.

What is claimed is:

1. A dielectric substance comprising:
   a core-shell grain having a twin crystal structure,
   wherein an interface of the twin crystal structure of the core-shell grain extends from a shell on one side, passes through a core, and extends to the shell on the other side.

2. The dielectric substance as claimed in claim 1, wherein the interface of the twin crystal structure contacts a grain boundary of the core-shell grain.

3. The dielectric substance as claimed in claim 1, wherein a ratio of a number of the core-shell grain with respect to crystal grains in the dielectric substance is 2% or more and 20% or less.

4. The dielectric substance as claimed in claim 1, wherein a main component of the core-shell grain is an oxide of Ba and Ti.

5. The dielectric substance as claimed in claim 1, wherein the core-shell grain includes an oxide of a rare earth element and includes at least one of oxides of Mg, V, Mn, Zr and Cr.

6. The dielectric substance as claimed in claim 1, further comprising:
   1.75 mol % to 3.50 mol % of an oxide of a rare earth element Re (Re means at least one of rare earth elements) on a presumption that an amount of a main component ceramic of the dielectric substance is 100 mol % and the rare earth element Re is converted into $Re_2O_3$; and
   0.02 mol % to 2.05 mol % of a total amount of oxides of Mg, V, Mn, Zr and Cr, on a presumption that the amount of the main component ceramic of the dielectric substance is 100 mol % and the oxides of Mg, V, Mn, Zr and Cr are converted into MgO, $MnO_2$, $ZrO_2$, $V_2O_5$ and $Cr_2O_3$.

7. The dielectric substance as claimed in claim 1 further comprising an oxide of Si.

8. The dielectric substance as claimed in claim 7 further comprising 0.25 mol % to 2.50 mol % of an oxide of Si on a presumption that an amount of a main component ceramic of the dielectric substance is 100 mol % and Si is converted into $SiO_2$.

9. An electronic device comprising a dielectric substance as claimed in claim 1.

10. The dielectric substance as claimed in claim 1, wherein a ratio of a number of the core-shell grains and a number of crystal grains contained in the dielectric substance is 8.5 or more and 15.9% or less.

11. A multilayer ceramic capacitor comprising:
a multilayer structure in which each of dielectric layers and each of internal electrode layers are alternately stacked, each of the dielectric layers including a core-shell grain having a twin crystal structure,
wherein an interface of the twin crystal structure of the core-shell grain extends from a shell on one side, passes through a core, and extends to the shell on the other side.

12. The multilayer ceramic capacitor as claimed in claim 11, wherein the interface of the twin crystal structure contacts a grain boundary of the core-shell grain.

13. The multilayer ceramic capacitor as claimed in claim 11, wherein a ratio of the core-shell grain with respect to crystal grains in one of the dielectric layers is 2% or more and 20% or less.

14. The multilayer ceramic capacitor as claimed in claim 11, wherein a main component of the core-shell grain is an oxide of Ba and Ti.

15. The multilayer ceramic capacitor as claimed in claim 11, wherein the core-shell grain includes an oxide of a rare earth element and includes at least one of oxides of Mg, V, Mn, Zr and Cr.

16. The multilayer ceramic capacitor as claimed in claim 11, wherein one of the dielectric layers includes 1.75 mol % to 3.50 mol % of an oxide of a rare earth element Re (Re means at least one of rare earth elements) on a presumption that an amount of a main component ceramic of the dielectric layers is 100 mol % and the rare earth element Re is converted into $Re_2O_3$, and
wherein the one of the dielectric layers include 0.02 mol % to 2.05 mol % of a total amount of oxides of Mg, V, Mn, Zr and Cr, on a presumption that the amount of a main component ceramic of the dielectric substance is 100 mol % and the oxides of Mg, V, Mn, Zr and Cr are converted into MgO, $MnO_2$, $ZrO_2$, $V_2O_5$ and $Cr_2O_3$.

17. The multilayer ceramic capacitor as claimed in claim 11, wherein the dielectric layers include an oxide of Si.

18. The multilayer ceramic capacitor as claimed in claim 17, wherein the dielectric layers include 0.25 mol % to 2.50 mol % of Si on a presumption that an amount of a main component ceramic of the dielectric layers is 100 mol % and Si is converted into $SiO_2$.

19. The multilayer ceramic capacitor as claimed in claim 11, wherein a ratio of a number of the core-shell grains and a number of crystal grains contained in the dielectric substance is 8.5% or more and 15.9% or less.

* * * * *